United States Patent

[11] 3,612,116

| [72] | Inventor | Arthur M. Ferrari<br>Barnham Ave., Corning, Calif. 96021 |
|---|---|---|
| [21] | Appl. No. | 882,165 |
| [22] | Filed | Dec. 4, 1969 |
| [45] | Patented | Oct. 12, 1971 |

[54] BAND MILL SAW GUIDE
16 Claims, 11 Drawing Figs.

[52] U.S. Cl. .................................................. 143/160 R,
83/201.15, 143/160 G
[51] Int. Cl. ............................................. B27b 13/10
[50] Field of Search............................................. 143/160,
17, 19; 83/201, 201.15

[56] References Cited
UNITED STATES PATENTS

| 2,684,697 | 7/1954 | Ferrari ........................ | 143/160 G |
| 2,934,106 | 4/1960 | Chapman et al. ............. | 143/160 R |
| 3,537,340 | 11/1970 | Westbrook ................... | 143/160 R |

*Primary Examiner*—Donald R. Schran
*Attorney*—Buckhorn Blore, Klarquist and Sparkman ABSTRACT: A saw guide for a band mill employed for sawing logs into lumber is provided with an outer guide member which is mounted for sliding movement on a rearwardly extending and upwardly inclined track. This guide member is held in its forward or saw-guiding position by a friction device so that it will be moved rearwardly and upwardly out of the way without being damaged if struck by any portion of the log carriage or log thereon when moving in the log-cutting direction. A plurality of spaced plungers in this guide member are urged toward the side of the saw by air under a predetermined pressure to hold the saw against an inner guide member on the other side of the saw, while at the same time water under a predetermined pressure urges the plungers away from the saw with lesser force so that release of the air pressure rapidly moves the plungers away from the saw. One or more feeler elements are positioned in front of the guide to sense the approach of any portion of the carriage or log which would strike the outer guide member during movement of the carriage in the log-cutting direction. Such movement causes release of the air pressure and also causes rapid upward movement of the entire saw guide by the usual saw-guide-positioning mechanism of a band mill.

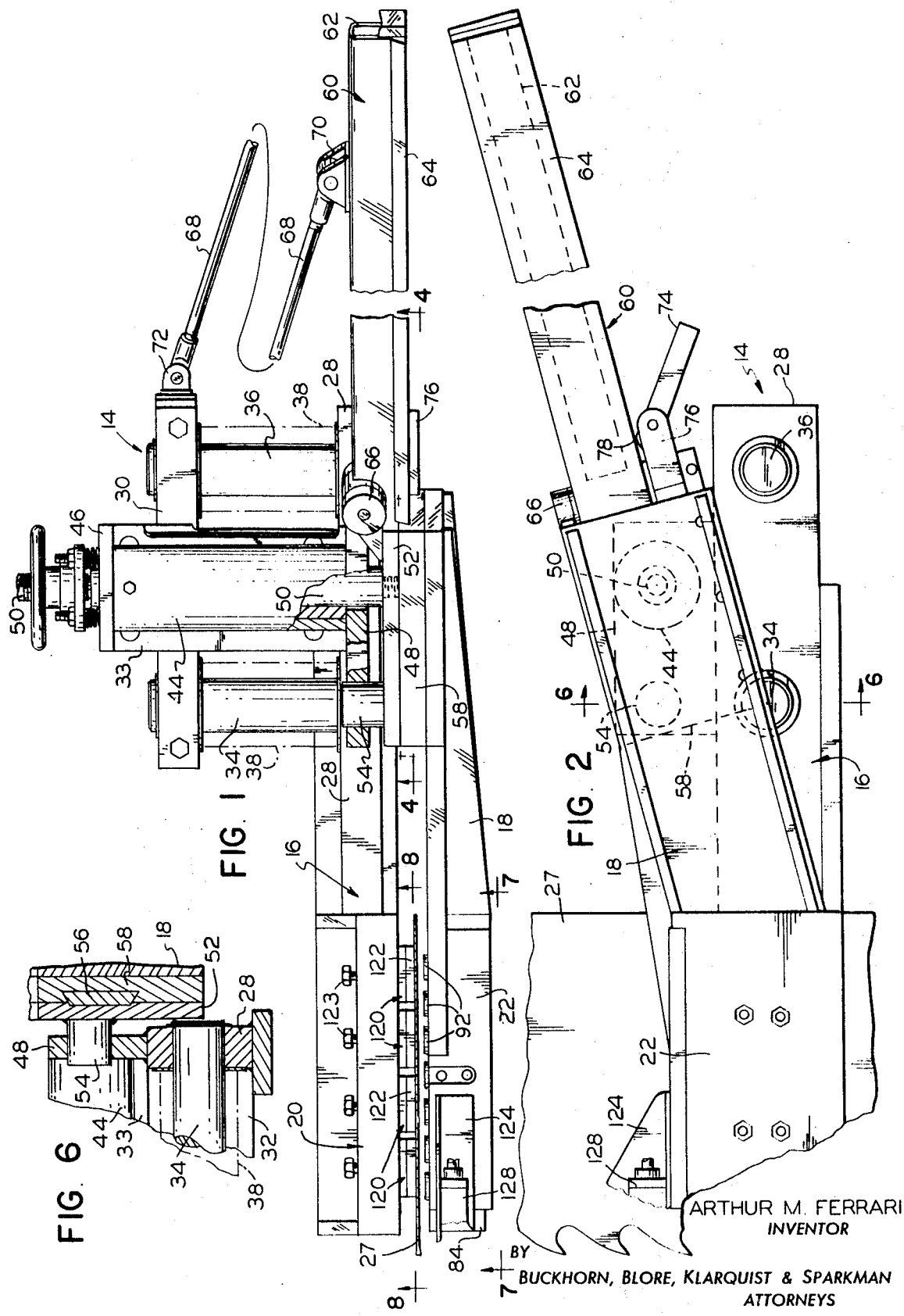

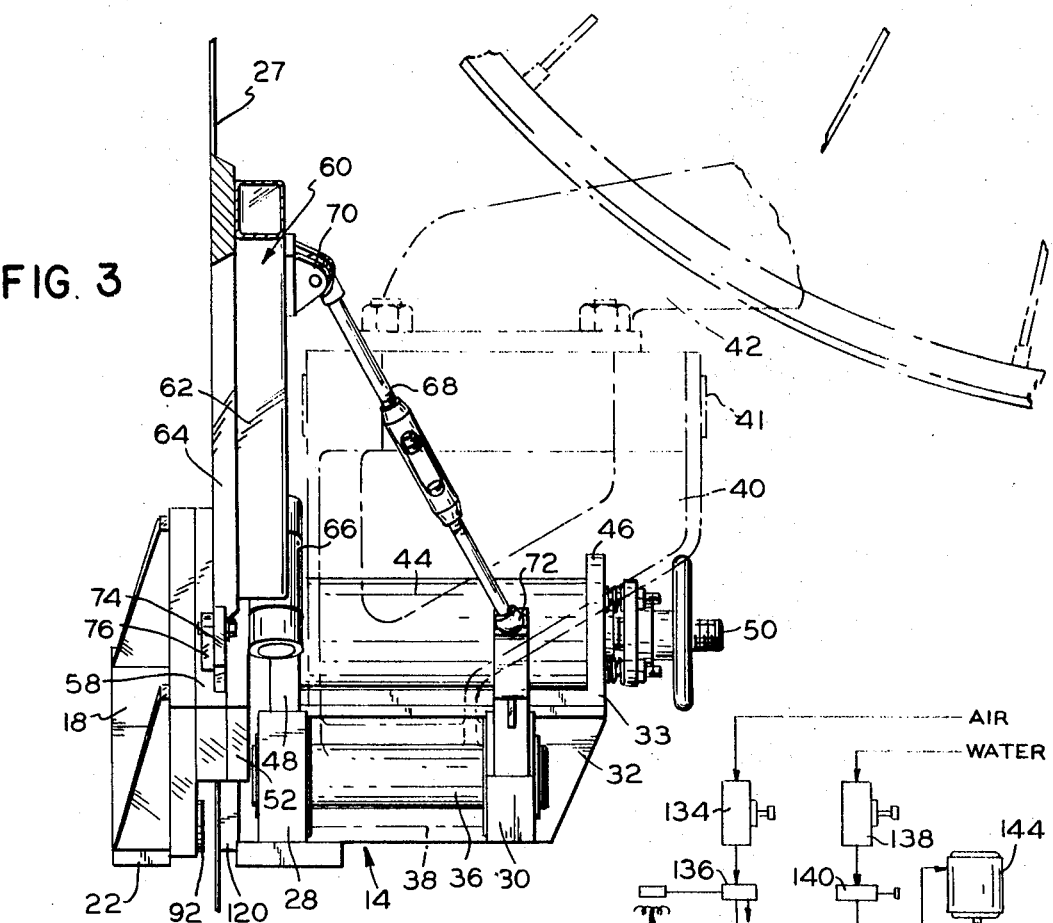
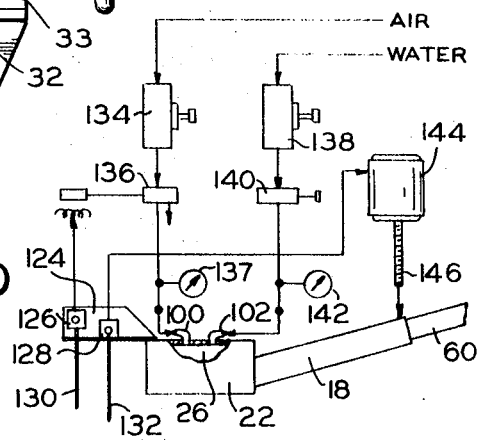
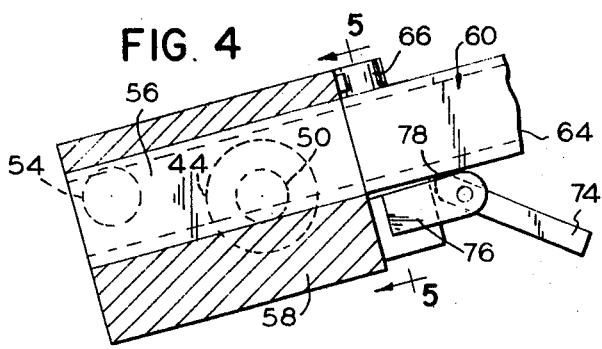
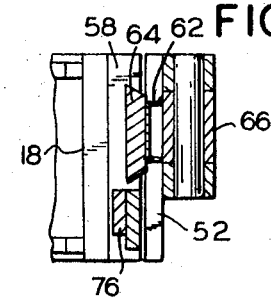

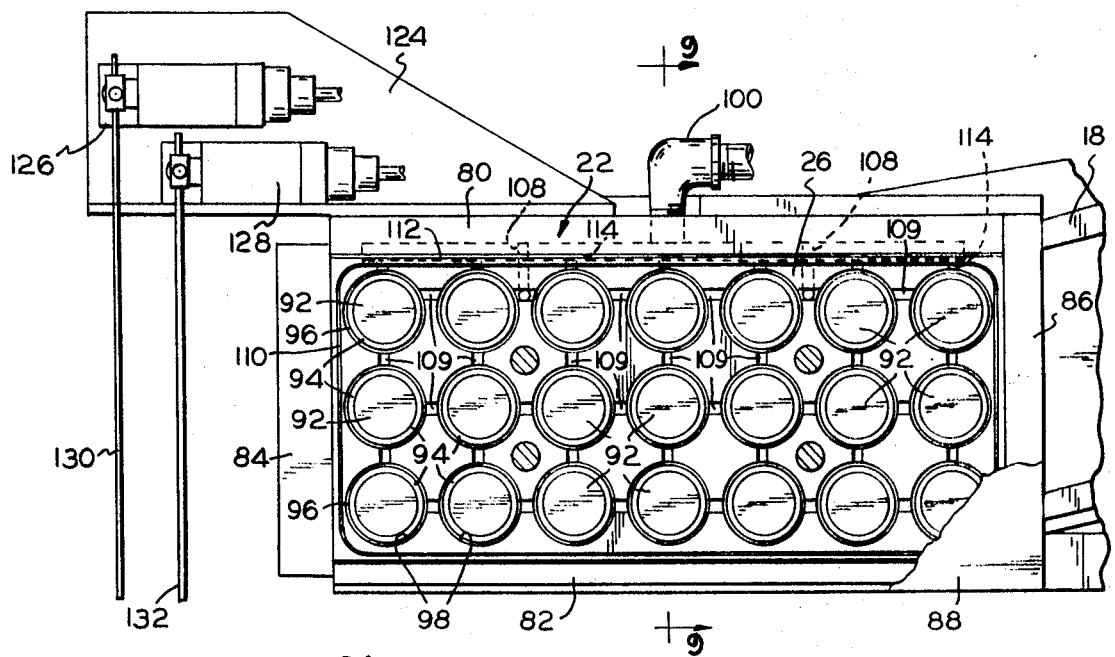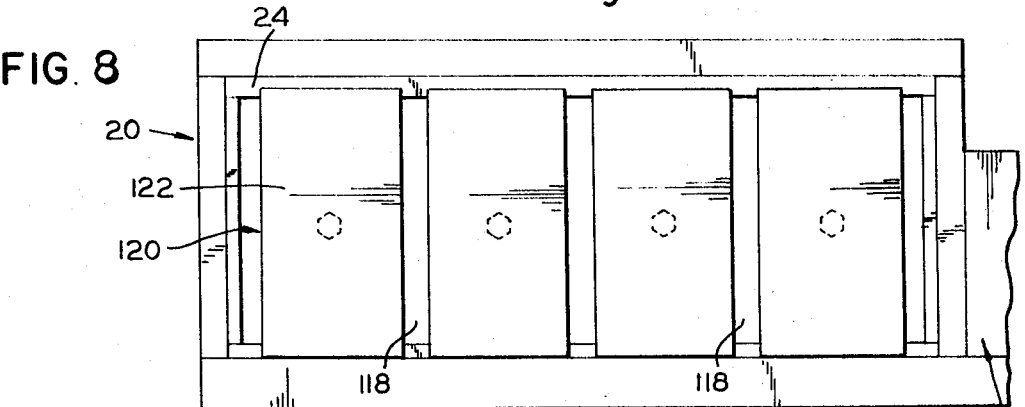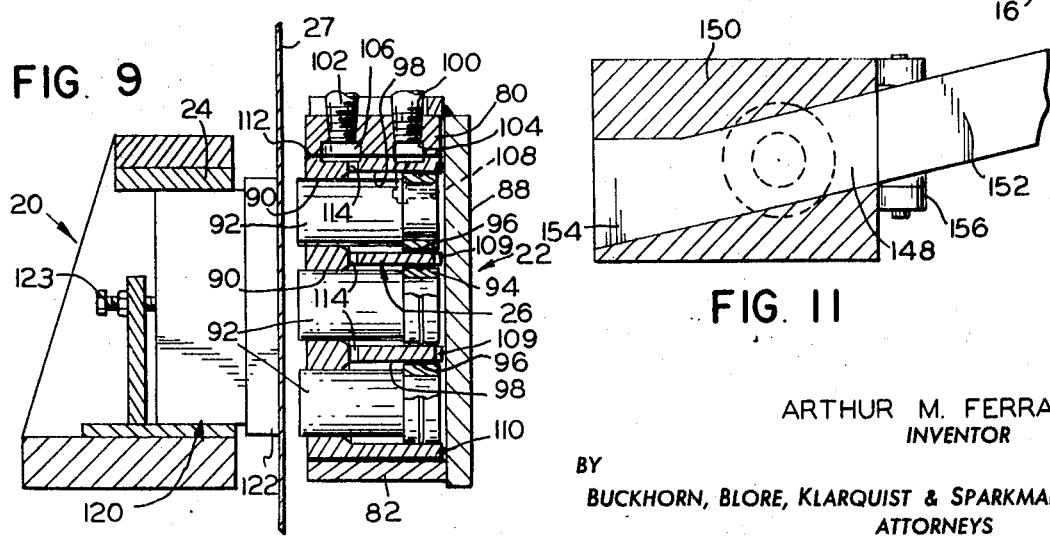

BAND MILL SAW GUIDE

BACKGROUND OF THE INVENTION

Band mills for cutting logs into lumber are of large size and, for example, for cutting large logs may have upper and lower band wheels as large as 10 feet in diameter with their axes spaced vertically from each other a distance of the order of 15 feet. This means that the unguided length of the bandsaw between the wheels is equal to the latter distance. Even through the bandsaws are of steel and are operated under high tension and have a thickness of the order of one-eighth inch or more and a width of the order of 16 inches when new, effective saw guides positioned as closely as practical to the upper and lower surfaces of the log or cant being cut, are required to prevent, as far as possible, any lateral displacement of the saw band and wandering of the resulting kerf particularly when irregularities such as large knots or the like are encountered during a passage of the saw lengthwise of the log.

The lower saw guide is ordinarily mounted in a fixed position in which it will not be struck the log carriage or log thereon. Conventional saw guides have included inner and outer saw guide members having elements engaging and guiding the two sides of the saw. Since the upper surface of the log being cut is variable in height, the upper saw guide is mounted on a vertically extending guideway and is vertically movable, for example, by a vertically extending screw driven by a reversible electric motor. The motor is usually wholly or partly manually controlled to position this guide just above the log being cut and to raise such guide to clear the forwardly movable vertical standards on the log carriage to which the log is dogged during cutting and which are moved toward the saw to advance the log a selected distance to make the next cut. Thus this guide must be raised to an upper position when the standards approach the edge of the carriage sufficiently close to strike the outer saw guide member. Failure of proper manual or automatic control of the position of the saw guide almost inevitably results in the saw guide being hit at least occasionally and knocked out of position or broken, requiring shutting down of the band mill and carriage until repairs are made. This occurs during the log-advancing or cutting run of the carriage.

It is also desirable that the tension in the bandsaw should be as great as practical in the portion of the saw which is actually cutting the kerf in order to prevent lateral wandering of the saw to thereby assist cutting a straight kerf. One proposed solution of the problem of both avoiding the displacement of the saw guide from its proper position by the carriage or log and providing the desired tension in the portion of the saw doing the cutting has been to completely omit the outer saw guide member and then offset the upper band wheel a short distance rearwardly so that the saw is bent over the inner saw guide member to thereby maintain the band in vertical alignment with the lower saw guide. This imposes a large lateral thrust on the saw and produces rapid wear of the surfaces of the inner saw guide in contact with the saw.

Spring-loaded guide members for upper saw guides have been proposed for forcing a saw against stationary guide members on the other side of the saw to impose a controlled frictional load or braking action on the saw and thus increase the tension of the saw as it is pulled through the log being cut. The difficulty of producing balanced pressures on the front and rear portions of the saw band and of accurately determining the actual pressure imposed by the springs, renders this type of saw guide impractical. For example, unequal pressures on the front and rear portions of the saw causes unequal heating of these portions due to unequal friction loads and resultant unequal thermal expansion longitudinally of the saw. This can result in saw running off the band wheels.

The application of even a desirable friction load on the saw by the upper saw guide also tends to impose an undue strain on the band wheels if the saw guide is struck and carried rearwardly of the saw as a result of movement of the carriage as discussed above, since the gripping action of the saw guide tends to carry the bandsaw with the guide.

SUMMARY

In accordance with the present invention, a saw guide for a band mill is provided in which the outer saw guide member only is displaced from the saw if engaged by the carriage. This outer member is held in alignment with the saw by a friction device and is moved rearwardly and upwardly along a track, if the saw guide is engaged by the carriage itself or by the log on the carriage as the carriage is moved in the log-cutting direction. In many cases this motion will, by itself, elevate the saw guide sufficiently to clear the carriage or log. In any event the time required for this movement enables feelers carried by the saw guide to be employed to control the actuation of the conventional saw-guide-raising mechanism to elevate the entire saw guide, including the track referred to, so that the saw guide clears the carriage or log before the saw guide reaches the end of such track. No injury to the saw guide results and it is merely necessary to move the outer guide member of the saw guide forwardly and downwardly along the track referred to above so as to again place it in operative saw-guiding position.

The saw guide also includes an accurately controllable pressure-applying system which grips the saw between the outer and inner guide members and applies balanced pressure to the sides of the saw. This system also provides for quick release of the pressure under control of a feeler carried by the saw guide to prevent damage to the saw guide or the saw.

The pressure-applying system includes a plurality of plungers in the other saw guide member which are urged toward the saw by pressure-regulated compressed air and are at the same time urged away from the saw with lesser force by water under pressure regulation. By employing plungers of the same size arranged in a balanced pattern forwardly and rearwardly of the saw and formed to expose piston areas to the compressed air, which are all of the same size, and also expose piston areas to the water, which are all of the same size, a uniform-braking action can be imposed on the saw. Furthermore, a feeler carried by the upper saw guide can control the actuation of a valve which rapidly releases the air pressure on the pistons so that the water rapidly withdraws them from contact with the saw prior to the outer guide member being moved from its saw-guiding position by the carriage or log thereon.

The pressure on the saw can be indicated at all times by standard fluid pressure gauges and can be accurately regulated by adjusting standard pressure regulators in the air- and water-supply lines. The result is that thinner bandsaw cutting a narrower kerf can be employed to cut a straight kerf resulting in a major saving of wood.

It is therefore an object of the present invention to provide an improved upper saw guide for a heavy-duty band mill in which an outer guide member can be displaced from its normal position and moved out of the path of a sawmill carriage if struck by such carriage or log thereon without injury to the saw guide or saw and such member can also be part of an improved system for applying tensioning pressure to the bandsaw, enabling thinner bandsaws to be employed.

BRIEF DESCRIPTION OF THE DRAWINGS

FIG. 1 is a plan view of the saw guide of the present invention with parts broken away and with the saw shown in horizontal section and a portion of the hanger for the guide shown in phantom view;

FIG. 2 is a partial side elevation of the saw guide of FIG. 1 showing the outer side of the guide with the hanger for the guide omitted;

FIG. 3 is a rear elevation of the saw guide of FIGS. 2 and 3 partly in section showing the hanger of the saw guide in phantom view and portions of the upper band wheel and saw;

FIG. 4 is a fragmentary vertical section taken on the line 4—4 of FIG. 1, showing the track element of a track block and the track member of a track bar providing for movement of the outer saw guide member from its operative position;

FIG. 5 is a fragmentary sectional view taken on the line 5—5 of FIG. 4;

FIG. 6 is a fragmentary vertical section taken on the line 6—6 of FIG. 2;

FIG. 7 is a partial side elevation of the saw guide viewed along the line 7—7 of FIG. 1 with the outer or back element of the holder for the outer saw guide member broken away to show the outer side of such saw guide member;

FIG. 8 is a side elevation of the inner guide member and its holder viewed along the line 8—8 of FIG. 1;

FIG. 9 is a vertical section through the inner and outer saw guide members and holders therefor taken on the line 9—9 of FIG. 7;

FIG. 10 is a simplified schematic diagram of suitable automatic controls for the saw guide; and FIG. 11 is a view similar to FIG. 4 showing a modified form of the slide block of the outer saw guide member and of the track element for the slide block.

DETAILED DESCRIPTION

Referring to FIGS. 1, 2 and 3, the saw guide of the present invention includes a support structure 14 for supporting inner and outer guide arms 16 and 18, respectively, extending horizontally forwardly from the central portion of the support structure. The guide arms include inner and outer holders 20 and 22, respectively, at their free ends for supporting inner and outer saw guide members 24 and 26, respectively, the saw guide members being best shown in FIG. 9 as engaging the inner and outer side surfaces of a bandsaw 27.

As shown in FIGS. 1, 2 and 3, the inner saw guide arm 16 extends rearwardly of the saw 27 from the holder 20 for the inner saw guide member 24 and includes a horizontal extending rectangular bar member 28 rigidly secured to and forming part of the support structure for the saw guide. This support structure also includes another horizontally extending rectangular bar member 30 spaced horizontally from the bar member 28 and secured to the bar member 28 by a bracing member 32 and by a horizontal upper plate member 33 extending at right angles to the bar members 28 and 30 and secured to the upper surfaces of these bar members.

Cylindrical hanger pins 34 and 36 each extend horizontally through aligned apertures in the bar members 28 and 30 and also through sleeves 38 positioned between the bars 28 and 32 and shown in phantom view in FIGS. 1 and 3. The sleeves 38 form part of upwardly extending hangers 40, also shown in phantom view in FIG. 3. The hangers 40 in turn have upper portions secured by pins 41 to a support member 42 also shown in phantom view in FIG. 3.

It will be understood that the support member 42 will be attached to the conventional slide member (not shown) forming part of heavy-duty band mills. Such slide member is mounted on a vertically extending guide structure (also not shown) so as to be vertically movable by a saw-guide-elevating mechanism described in more detail below. The hangers 40 and support member 42 thus support the saw guide for upward and downward movement parallel to the cutting portion of the saw.

The support structure of the saw guide also includes a horizontally extending sleeve member 44 having one end secured to a bracket member 46 extending upwardly from one end of the plate member 33, and its other end secured to a second bracket member 48 extending upwardly from the bar member 28 forming part of the inner guide arm 16. A shaft 50 extends through the sleeve member 44 and aligned apertures in the bracket members 46 and 48 and has its end adjacent the bracket member 48 secured to one end of a track block 52. As shown in FIG. 1, the track block 52 has a stud 54 secured to and extending horizontally from the track block 52 parallel to the shaft 50. This stud 54 is received in an aperture in the bracket member 48 to prevent rotation of the shaft 50 and track block 52 about the axis of the shaft 50. The track block 52, as shown in FIG. 6, has a dovetail track element 56 secured thereto and inclined upwardly and rearwardly, as shown in FIG. 4, to provide the lower end of an inclined track upon which a slide block 58 having a corresponding dovetail groove is mounted.

As shown in FIGS. 1, 2 and 3 and 5, an elongated track bar 60 is fabricated from a rectangular tubular backing member 62 and a parallel dovetail track member 64 secured together. The track bar 60 has one end hinged to the track block 52 by a hinge 66.

The track bar is held in the rearwardly and upwardly inclined operative position, shown in FIGS. 1, 2 and 3, by a bracing rod 68 having one end pivotally connected to a connecting member 70 secured to the track bar 60 adjacent its end remote from the hinge 66. The other end of the bracing rod 68 is pivotally connected to a connecting member 72 secured to one end of the bar 30 forming part of the saw guide support structure 14. The bracing rod 68 will yield to allow pivoting of the track bar about the hinge 66 if undue stress is applied to the track bar 60. As best shown in FIG. 4, the dovetail track member 64 on the track bar 60 is positioned in alignment with the track member 56 on the track block 52 to provide a continuous track along the track block and track bar for the slide block 58 shown in FIGS. 1, 5 and 6.

The outer guide arm 18 has its end remote from the holder 22 for the outer saw guide member 26 rigidly secured to the slide block 58. The slide block constitutes the sole support for the outer guide arm and the other guide member 26. The slide block 58 is held in its forward and lower position by a friction lock device including a gripping lever 74 pivoted adjacent one of its ends to a bracket 76 secured to the rearward end of the slide block 58. The bracket 76 extends parallel to and adjacent the track member 64 of the track bar 60 to position such end of the gripping lever 74 for contact with the track member 64. A camming surface 78 is formed on this end of the gripping lever and manual pivoting of this lever in a clockwise direction in FIGS. 4 and 6 causes the camming surface 78 of this lever to frictionally lock the slide block 58 in position on the track block 52 and take up any lost motion between the slide block and the track element 56 on the track block.

It will be apparent that a force applied to the slide block 58 through the outer guide arm 18 tending to move the slide block to the left in FIG. 2 will first unlock the friction-locking device including the lever 74, and that the slide block and outer guide arm 18 mounted thereon can thereafter move up the inclined track provided by the track element 56 on the track block 52 and the track member 64 on the track bar 60.

As shown in FIGS. 7 and 9, the holder 22 for the outer saw guide member 26 is a box shaped member having top and bottom wall members 80 and 82, respectively, end wall members 84 and 86 and a front wall member 88. The saw guide member 26 is a block of metal fitting within the holder 22 and having a plurality of bores 90 extending horizontally therethrough. A plunger 92 is positioned in each of the bores and has an end projecting from its respective bore toward the saw 27. The plungers 92 are made of any of a number of thermosetting resin compositions conventionally employed for guiding elements for bandsaws.

Each of the plungers 92 has a metal collar 94 pressed on its end remote from the saw. The metal collar has a groove in its periphery receiving an O-ring 96 fitting an enlarged portion 98 of the bore 90.

The top wall member 80 of the carrier 22 is provided with bores extending therethrough, one of which is threaded to receive a fitting 100 for a compressed-air conduit and the other threaded to receive a fitting 102 for a conduit for water under pressure. The top wall member 80 and the top of the outer saw guide member 26 have registering grooves forming a duct 104 communicating with the air fitting 100 and extending lengthwise of these members. Similarly registering grooves form a duct 106 registering with the water fitting 102.

The groove in the top of the outer saw guide member 26 forming part of the duct 104 communicates through ducts 108 with the space between the surfaces of this member adjacent the front wall member 88 of the holder 22 and this front wall. This face of the member 88 has a plurality of vertical and horizontal grooves 109 providing air passages interconnecting the enlarged portions 98 of the bores 90 with the ducts 108.

The boundary of the area of this surface of the outer saw guide member which includes the bores receiving the plungers 92 and the ducts 108 and grooves 109 is sealed to and spaced from the inner surface of the front wall 88 of the holder 22 by a rectangular ring 110 of round cross section, similar to an O-ring, which is received in a groove in such surface of the outer saw guide member. The outer saw guide member is secured to the inner face of the front wall member 88 of the holder 22 by screws (not shown) extending through the front wall member 88 of the holder 22 into the member 26 to compress the ring 110 between the member 26 and the wall member 88.

The outer saw guide member 26 is also urged upwardly against a gasket 112 between the top surface of such member and the top wall member 80 of the holder 22 by screws (not shown) extending through the top wall member 80 of the holder 22 into member 26 to seal the saw guide member 22 to the top wall member 88 around the ducts 104 and 106.

It will be apparent that the introduction of air into the space between the outer saw guide member 26 and the front wall member 80 of the holder 22 will apply air pressure to the ends of the plungers 92 to tend to force the exposed end of the plungers 92 from the retracted position shown in FIG. 8 to the extended position against the saw 27 shown in FIG. 1.

As shown in FIG. 8, a plurality of water ducts 114 in the outer saw guide member 22 extend downwardly from the water duct 106 at the top of the outer saw guide member into the upper bores 90 in such member and continue downwardly in such member to interconnect such upper bores with the lower similar bores. The ducts 114 communicate with the enlarged portions 98 of the bores 90 on the side of the O-rings 96 opposite the front wall 88 of the holder 22.

It will be further apparent that introduction of water under pressure through the water fitting 102 will tend to retract the plungers 92 to the position shown in FIG. 8 so as to move them out of contact with the saw. By supplying air and water under pressure to the fittings 100 and 102, respectively, so that the force applied to each of the plungers 92 by the air is greater than that applied by the water, and regulating the pressures on both the air and water, the plungers 92 can be pressed against the saw with a desired constant force and release of the air pressure at any time will cause immediate retraction of the plungers.

Sufficient clearance is provided between the end portions of the plungers 92 directed toward the saw and the bores 90 through which these portions of the plungers project that a small amount of water escapes around the plungers when water under pressure is introduced into the outer saw guide member through the water fitting 102. This constantly washes the end portions of the plungers and keeps the ends of the plungers 92 in contact with the saw moistened with a film of water.

The cutting portion of the saw 27 is maintained in a fixed lateral position by the inner saw guide member 24 positioned in the holder 20 at the forward end of the inner guide arm 16. This holder is a rectangular metal frame with its longer dimension horizontal. The frame has a plurality of vertical partitions 118 dividing the frame into sockets, each receiving and fitting a saw-contacting element 120 having an enlarged face portion 122 provided with a flat surface engaging the inner surface of the saw 27. These saw-contacting elements may be made of the same material as the plungers 92 of the outer saw guide member 18 or of a similar material. Each of the individual saw-contacting elements can be brought to a proper position with its face 122 against the side of the saw by an adjusting screw 123 engaging the rear portion of the element.

The holder 22 for the outer saw guide member 26 has a forwardly projecting bracket 124 upon which are mounted a pair of electric switches 126 and 128 which are actuated by feelers 130 and 132, respectively, The feelers are positioned to be moved by any portion of the sawmill carriage or log thereon which would thereafter engage any portion of the holder 22 for the outer saw guide member 26 during movement of the carriage (not shown) to the left in FIG. 7, which is the direction of movement of the carriage for making a cut through the log.

The switches 126 and 128 and their associated feelers 103 and 132 are also indicated in the simplified diagram of the automatic control system for the saw guide structure shown in FIG. 10. This figure also shows the holder 22 for the outer saw guide member 26 and its support arm 18 as well as the air fitting 100 and water fitting 102. As indicated in FIG. 10, air under pressure may be supplied to the air fitting 100 through an adjustable air pressure regulator 134. This air also passes through a solenoid valve 136 which during normal operation of the band mill delivers air from the pressure regulator 136 to the air fitting 100. The pressure of this air may be indicated by an air pressure gauge 137 positioned for observation by the sawyer. Upon movement of the feeler 130 to actuate the switch 126, the solenoid valve 136 operates to shut off the supply of air from the pressure regulator 134 and exhausts the air from the saw guide member 26.

The water supplied to the outer saw guide member 26 is delivered through an adjustable water pressure regulator 138 and a manually controlled valve 140 to the water fitting 102. A water pressure gauge 142 showing the water pressure delivered to the outer saw guide member may also be positioned for observation by the sawyer.

As is conventional in heavy-duty band mills, the entire saw guide including both the inner and outer saw guide members and their support structures can be rapidly elevated and lowered, for example, by a reversible electric motor 144 shown diagrammatically in FIG. 10 driving a screw 146 engaging a vertically guided slide member carrying the saw guide. The switch 128 actuated by the feeler 132 when moved by the carriage or log thereon causes operation of the motor 144 to rapidly elevate the saw guide out of the way.

Ordinarily there will be insufficient time after the feeler 132 has been moved by the carriage for the motor to elevate the saw guide before the carriage engages the holder 26 for the outer saw guide member. The release of the air pressure from the outer saw guide member by the solenoid valve 136 as the result of the carriage engaging the feeler 132 is however quite rapid so that the plungers 92 of the outer saw guide member are retracted and the pressure from the plungers released from the side of the saw before the carriage moves the holder 22.

No damage to the saw guide structure results by movement of the outer saw guide member as the outer saw guide holder 22 and its support arm 18 are merely moved up the inclined track bar 60 by the carriage to carry the outer saw guide member 26 away from the saw. The resulting upward movement of the holder 22 for the saw guide member 26 is usually enough to move this holder out of the way of the carriage. If not, sufficient time is provided during the movement of the holder 22 and guide arm 18 along the track bar 60 to enable the motor to elevate the saw guide out of the way of the carriage.

FIG. 11 shows a modified form of track element 148, slide block 150 and track member 152 providing a friction-wedging action holding the slide block 150 and therefor the outer saw guide member in operative position. The modified track element 148 has a wedge-shaped widened portion 154 at its lower end having a dovetail structure indicated by dotted lines extending along the edges of the wedge-shaped portion. The slide block 150 has a similar-formed dovetailed groove therein so that the slide block 150 is frictionally held in the position shown but can be moved to the left in FIG. 11 upwardly and rearwardly along the track member 152 forming part of a track bar similar to the track bar 60 of FIGS. 1 and 2, hinged to a track block by a hinge 156 similar to the hinge 66 of FIGS. 1, 2 and 3.

With either the structure of FIGS. 1 to 4 or the modification of FIG. 11, to put the saw guide back into operation after it has been moved away from the saw, it is merely necessary to move the feelers 130 and 132 to their operative position and then manually slide the outer saw band guide structure including the outer guide arm 18 and the carrier 22 with its contained saw guide member 26 forwardly and downwardly along the track bar 60 to its operative position.

The precision control of the saw guide pressure on the saw possible in the system of the present invention particularly when coupled with the automatic pressure release of such pressure and the lack of damage to the saw or saw guide, or to any of the other portion of the band mill structure when the outer saw guide member is moved out of position by the carriage, enables saws of thinner gauge and cutting a narrower kerf to be employed than with prior band mill constructions. This is true since a greater tension can be accurately maintained in the portion of the band mill being pulled through the log to cut the log. This results in a major saving of wood.

I claim:
1. A saw guide for a band mill having a bandsaw for cutting lumber from a log carried on a sawmill carriage movable past the band saw, comprising:
   a saw guide structure including inner and outer saw guide means and support means for supporting said saw guide structure with said inner and outer saw guide means in saw-guiding position in engagement with the inner and outer sides of the band saw, respectively;
   said support means including elongated track means extending in the general direction of log-cutting movement of said carriage from a position adjacent said saw-guiding position of said saw guide means;
   and means for mounting at least said outer saw guide means in said track for movement in said direction along said track away from said saw-guiding position in the event said outer saw guide means is engaged by said carriage during movement of said carriage in said log-cutting direction.

2. The saw guide of claim 1 in which:
   said track means is inclined away from said carriage as it extends in said general direction to also cause movement away from said carriage of the saw guide means being moved along said track by said movement of said carriage.

3. The saw guide of claim 1 in which:
   said support means for said guide structure is supported on said band mill for movement of said saw guide structure in a direction extending at right angles to the direction of movement of said carriage;
   said band mill including saw-guide-positioning means for rapidly moving said saw guide structure away from said carriage in the last-mentioned direction;
   and said saw guide structure includes sensing means for sensing when said outer guide means will be engaged by said carriage during said log-cutting movement and for actuating said saw-guide-positioning means to move said saw guide structure away from said carriage as said outer saw guide means is moved along said track by said carriage.

4. The saw guide means of claim 3 in which:
   the sensing means is a feeler element mounted on said outer saw guide means for engagement with said carriage before said carriage engages said outer saw guide means.

5. The saw guide of claim 1 in which:
   said inner saw guide means is rigidly secured to said support means and said outer saw guide means is mounted on and movable along said track.

6. The saw guide of claim 5 which includes:
   means for frictionally holding the outer saw guide means in saw-guiding position.

7. The saw guide of claim 5 in which:
   said support means is positioned back of said saw with respect to said log-cutting movement of said carriage;
   and said inner and outer saw guide means when in saw-guiding position are each secured to an arm extending forwardly from said support means;
   said arm for said outer saw guide means having its end adjacent said support means provided with slide means secured in sliding engagement to said track;
   and friction means between said arm and said track for releasably locking said arm to said track to hold said outer saw guide means in saw-guiding position.

8. The saw guide of claim 1 in which:
   one of said saw guide means includes means for resiliently applying pressure to one side of said saw to force the other side of said saw against said the other saw guide means;
   and sensing means is carried by said saw guide structure for sensing when said outer guide means will be engaged by said carriage during said log-cutting movement;
   and said saw guide includes means actuated by said sensing means for releasing said pressure.

9. The saw guide of claim 1 in which:
   one of said saw guide means includes force-applying means for resiliently applying pressure to one side of said saw to force said saw against the other of said saw guide means;
   and said force-applying means includes a plurality of similar plunger means positioned in cylinders in said one saw guide means and having portions extending from said cylinders and exposed ends having bearing surfaces directed toward a side surface of said bandsaw;
   and means for supplying fluid under regulated pressure to said cylinders for forcing said ends of said plungers against said side surface of said saw.

10. The saw guide means of claim 9 in which:
    the other of said saw guide means includes a plurality of pressure-resisting elements secured in said other saw guide means and having bearing surface directed toward the other side of said saw.

11. The saw guide of claim 10 which includes:
    means for supplying a second fluid under regulated pressure to said cylinders to urge said plungers away from said surface of said saw with a less force than that applied by said first fluid;
    and sensing means carried by said saw guide structure for sensing when said outer guide means will be engaged by said carriage during said log-cutting movement;
    and means actuated by said sensing means for releasing said regulated pressure of the first-mentioned fluid to cause said plungers to be retracted from contact with said saw by said second fluid.

12. The saw guide of claim 11 in which:
    the first-mentioned fluid is air and the second fluid is water and the portions of said plungers extending from said cylinders provide clearance with said cylinders for limited escape of water from said cylinders.

13. A saw guide for a band mill having a bandsaw, comprising:
    a saw guide structure including inner and outer saw guide means;
    and support means for supporting said saw guide structure with said saw guide means in saw-guiding position in engagement with the inner and outer sides of the bandsaw, respectively;
    one of said saw guide means including force-applying means for resiliently applying pressure to one side of said saw to force the other side of said saw against the other saw guide means;
    said force-applying means including a plurality of similar plunger means positioned in cylinders in said one saw guide means and having portions extending from said cylinders and exposed ends having bearing surfaces directed toward one side surface of said saw;
    means for supplying a first fluid under regulated pressure to said cylinders for forcing said ends of said plungers against said side surface of said saw;
    and means for supplying a second fluid under regulated pressure to said cylinders to urge said plungers away from said surface of said saw with less force than that applied by said first fluid.

14. The saw guide of claim 13 in which:

said first fluid is air and said second fluid is water and the portions of said plungers extending from said cylinders provide clearance with said cylinders for limited escape of water from said cylinders toward said saw.

15. The saw guide of claim 14 in which:

the other of said saw guide means has a plurality of pressure-resisting elements fixed therein with aligned bearing faces directed toward the other side of the saw to enable said saw to be gripped with controllable gripping force between said plungers and said pressure-resisting elements.

16. The saw guide of claim 13 which also includes:

sensing means carried by said saw guide structure for sensing when said outer guide means will be engaged by said carriage during said log-cutting movement;

and means actuated by said sensing means for releasing said regulated pressure of the first-mentioned fluid to cause said plungers to be retracted from contact with said saw by said second fluid.